United States Patent [19]
Snell et al.

[11] Patent Number: 5,566,585
[45] Date of Patent: Oct. 22, 1996

[54] TILT STEERING COLUMN LOCKING MECHANISM

[75] Inventors: William M. Snell, Grand Blanc; Rodney L. Eaton, Clarkston; David A. White, Goodrich; Thomas S. Kaliszewski, Troy, all of Mich.

[73] Assignee: Chrysler Corporation, Auburn Hills, Mich.

[21] Appl. No.: 442,233

[22] Filed: May 15, 1995

Related U.S. Application Data

[63] Continuation-in-part of Ser. No. 205,221, Mar. 3, 1994, Pat. No. 5,452,624.

[51] Int. Cl.⁶ ..................................................... B62D 1/18
[52] U.S. Cl. ........................... 74/493; 74/540; 280/775
[58] Field of Search ....................... 74/493, 540; 280/775

[56] References Cited

U.S. PATENT DOCUMENTS

| | | | |
|---|---|---|---|
| 4,594,909 | 6/1986 | Yamaguchi | 74/493 |
| 4,892,330 | 1/1990 | Beauch | 74/493 X |
| 5,143,402 | 9/1992 | Higashino et al. | 74/493 X |
| 5,144,855 | 9/1992 | Yamaguchi et al. | 74/493 |
| 5,452,624 | 9/1995 | Thomas et al. | 74/493 |

*Primary Examiner*—Allan D. Herrmann
*Attorney, Agent, or Firm*—Edward A. Craig

[57] ABSTRACT

Apparatus for releasably locking the tilt steering column assembly of an automotive vehicle in adjusted position. A rack on the steering column assembly is engaged by a pawl to lock the steering column assembly in the position selected by the driver. A bracket is provided to hold the pawl engaged with the rack and prevent it from becoming disengaged. The tilt of the steering column can be re-adjusted by moving the bracket so that the pawl can disengage the rack. A latch is provided for latching the bracket in its position holding the pawl engaged with the rack.

12 Claims, 4 Drawing Sheets

TILT STEERING COLUMN LOCKING MECHANISM

REFERENCE TO RELATED APPLICATION

This application is a continuation-in-part of application Ser. No. 08/205,221, filed Mar. 3, 1994 now U.S. Pat. No. 5,452,624.

FIELD OF THE INVENTION

This invention relates generally to tilt steering columns for automotive vehicles, and more particularly to apparatus for releasably locking a tilt steering column in adjusted opposition.

BACKGROUND AND SUMMARY

Many automobiles have steering columns which can be tilted to an adjusted position selected by the individual driver. A locking mechanism is provided to hold the steering column in the selected position.

In accordance with the present invention, the locking mechanism comprises a rack and a pawl which, when engaged, lock the steering column in adjusted position. A bracket is provided to hold the pawl engaged with the rack.

Preferably, a latch is provided to positively latch the bracket in its position holding the pawl engaged with the rack. Without the latch, it is possible for the pawl to become accidentally disengaged from the rack.

When it is desired to change the angle of the steering column, the bracket may be moved to a release position allowing the pawl to be disengaged. Prior to moving the bracket to release position, the latch is tripped to unlatch the bracket. A release lever is provided to trip the latch and also to move the bracket to its release position.

One object of this invention is to provide a locking mechanism for a tilt steering column which is positive in operation and has the foregoing features and capabilities.

Another object is to provide apparatus for locking the tilt steering column in adjusted position which is composed of a relatively few simple parts, is rugged and durable in use, and can be inexpensively manufactured and assembled.

Other objects, features and advantages of the invention will become more apparent from the following description and claims, especially when considered with the accompanying drawings.

DETAILED DESCRIPTION

Figure 1:
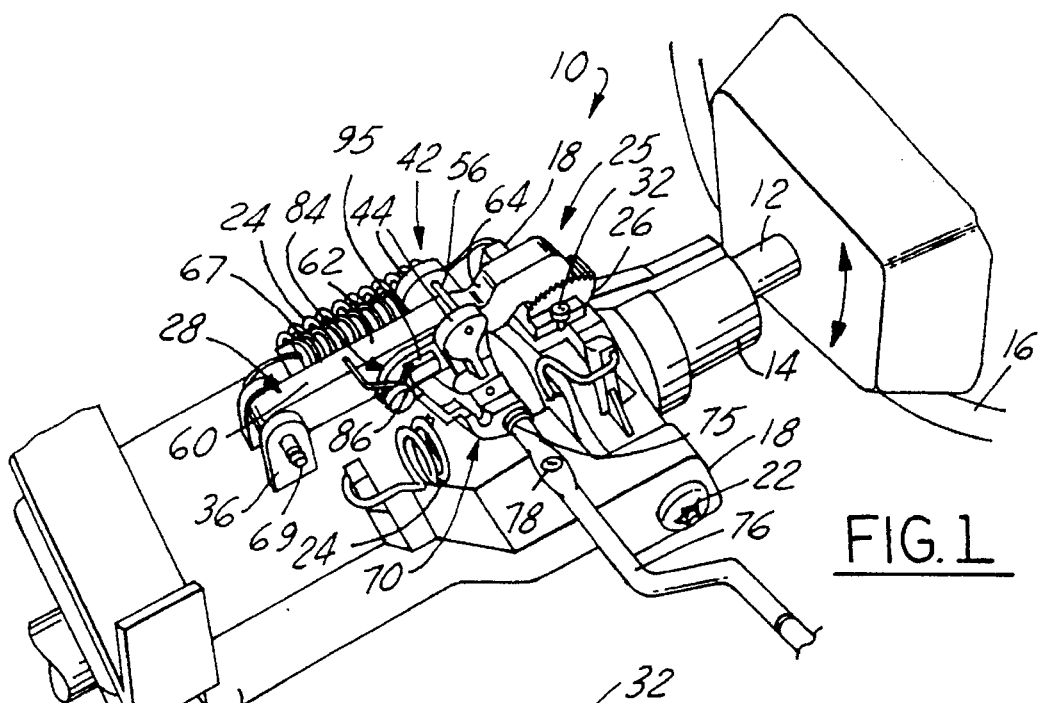
FIG. 1 is a perspective view of apparatus for releasably locking the tilt steering column of an automobile in adjusted position, constructed in accordance with the invention.
Figure 2A:
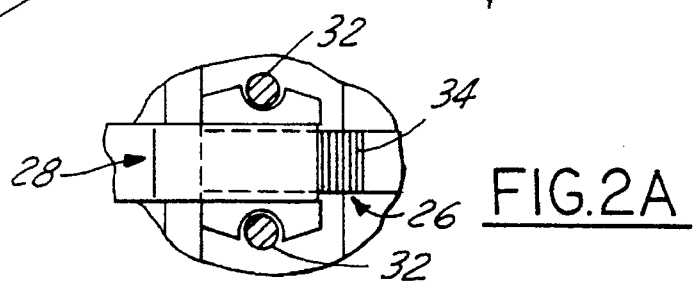
FIG. 2A is an enlarged detail of a portion of the structure in FIG. 2.
Figure 2:
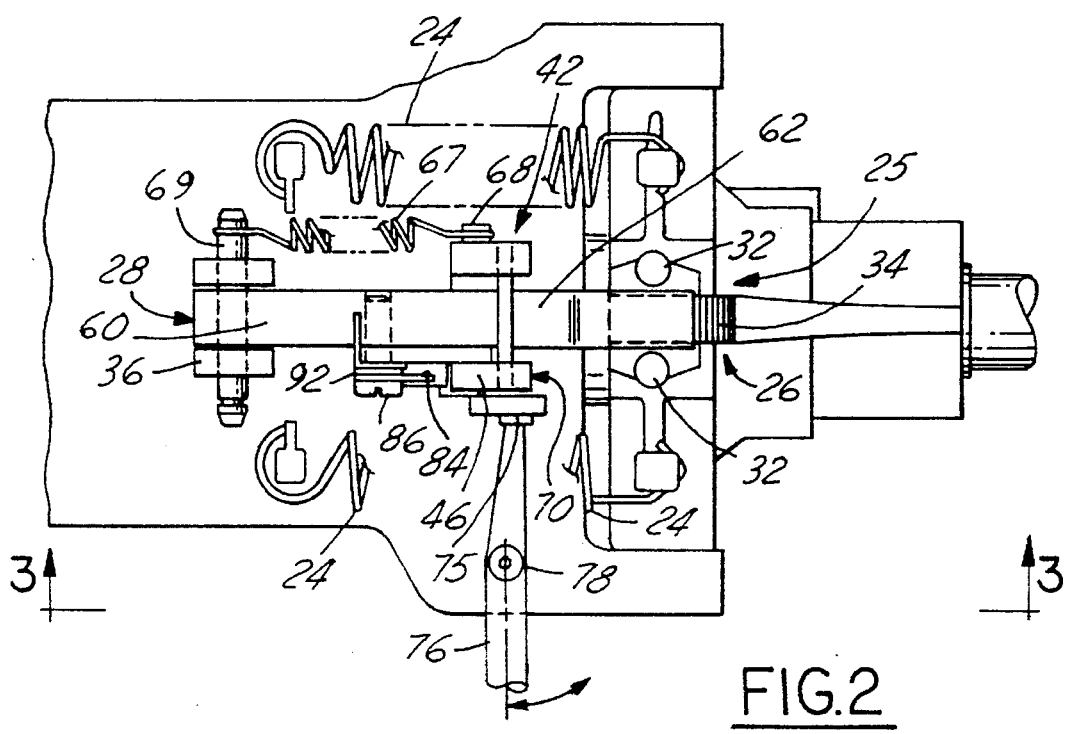
FIG. 2 is a top plan view of the apparatus shown in FIG. 1, with parts broken away.

Referring now more particularly to the drawings, the steering column assembly 10 comprises a steering column 12 mounted in a housing 14, with a steering wheel 16 on the upper end of the steering column. The steering column housing 14 extends between the arms 18 of a support structure 20 and is pivoted to the arms 18 by horizontal pivots 22 for vertical adjustment about an axis perpendicular to the longitudinal center line of the vehicle and of the steering column. The pivotal support for the housing 14 permits the steering column 12 to be adjusted vertically as shown by the arrow in FIG. 1 to a position desired by the driver, but within a range in which the steering column extends at an angle generally upwardly and rearwardly of the motor vehicle. Coil springs 24 are secured at their ends to the support structure 20 and to the housing 14 and urge the housing to swing upwardly to a limiting position making it easier for the driver to get in and out of the vehicle. The support structure 20 is rigidly secured to the automobile frame.

A locking mechanism 25 comprises a rack 26 and an elongated pawl 28. The locking mechanism is provided to releasably lock the steering column assembly 10 in adjusted position. The rack 26 is secured to the upper surface of the housing 14 by fasteners 32. The rack 26 and has a series of spaced apart rack teeth 34 on its upper surface extending perpendicular to the axis of pivotal adjustment of the steering column housing 14. The pawl 28 extends perpendicular to the axis of pivotal adjustment of the steering column housing. The front end of the pawl is pivoted for vertical pivotal movement on a cleat 36 rigidly mounted on the upper surface of the support structure 20. The rear end of the pawl 28 has a series of spaced apart teeth 38 on its lower surface which are opposed and complementary to the rack teeth 34 and when engaged with the rack teeth lock the steering column housing 14 in adjusted position. A compression coil spring 40 is mounted in the upper surface of the support structure 20 beneath the pawl 28 and about midway between the ends of the pawl and presses upwardly against the pawl urging it to a position in which the pawl teeth are disengaged from the rack teeth.

The pawl 28 can be held down in an operative position in which the pawl teeth 38 engage the rack teeth 34 by a bracket 42. The bracket has laterally spaced legs 44 and 46 which straddle an upstanding mounting portion 48 on the support structure 20. The legs are pivotally connected to the mounting portion 48 by a horizontal pivot pin 50 which extends perpendicular to the pawl 28. The legs 44 and 46 are connected to one another about midway of their length by an integral web 52 which is disposed above the mounting portion 48 and beneath the pawl. A horizontal lock or cam pin 56 connects the upper ends of the legs 44 and 46 above the pawl.

The top of the pawl has a cam surface 60 and this cam surface has a locking surface portion 62 and a release surface portion 64. The locking surface portion 62 is generally flat and extends lengthwise of the pawl. The release surface portion 64 is rearwardly of the locking surface portion 62 and extends in continuation of the locking surface portion and constitutes a dip or relief or depressed area relative to the locking surface portion 62. The bracket 42 can be pivoted between positions in which the cam pin 56 engages the locking surface portion 62 (FIGS. 3, 11 and 12) or the release surface portion 64 (FIG. 13).

The web 52 of the bracket has a lobe 66 at the front edge. When the bracket is pivoted to its FIG. 13 position, the lobe 66 engages the underside of the pawl 28 and raises it to the position shown in which the pawl and rack teeth are disengaged. Spring 40 assists in raising the pawl. The release surface portion 64 has an inclined surface 65. Bracket pin 56 rides up surface 65 when the bracket is pivoted to the position of FIGS. 3, 11 and 12 to cam the pawl down into engagement with the bracket teeth.

Figure 3:
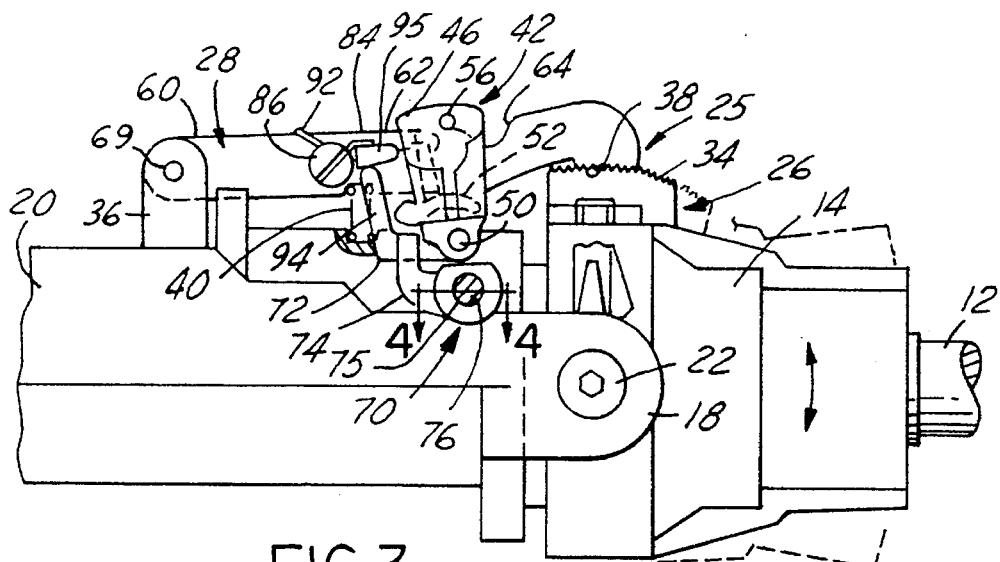
FIG. 3 is a side elevational view with parts broken away and in section as seen on the line 3—3 in FIG. 2.
Figure 4:
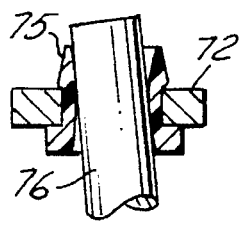
FIG. 4 is a sectional view taken on the line 4—4 in FIG. 3.
Figure 5:
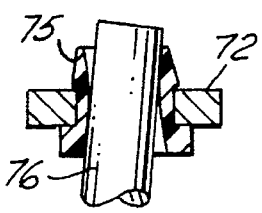
FIG. 5 is a sectional view similar to FIG. 4, but showing the parts in a different position.
Figure 6:
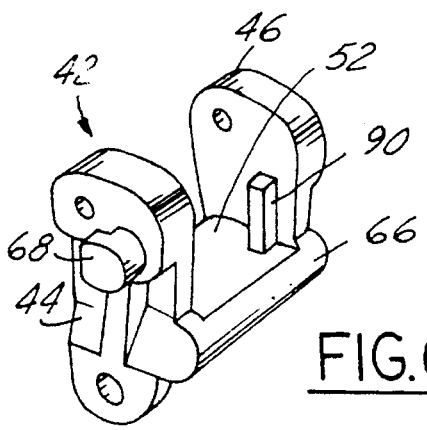
FIG. 6 is a perspective view of the bracket for holding the pawl of the locking mechanism engaged to prevent accidental release, but with the bracket pin removed.
Figure 7:
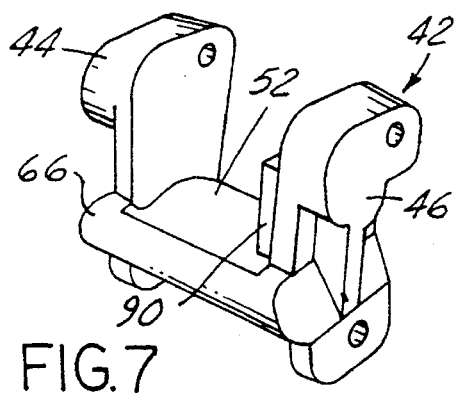
FIG. 7 is a perspective view of the bracket shown in FIG. 6 as seen from the opposite side.
Figure 8:
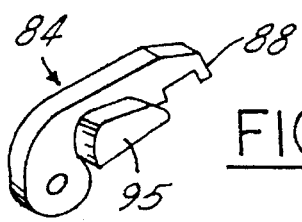
FIG. 8 is a perspective view of the bracket latch.
Figure 9:
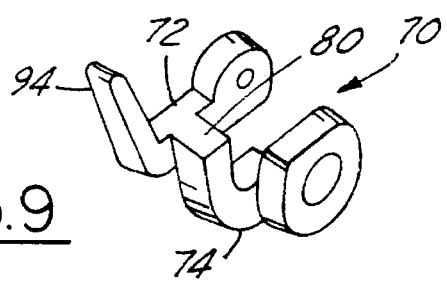
FIG. 9 is a perspective view of the release lever for releasing the latch and moving the bracket.
Figure 10:
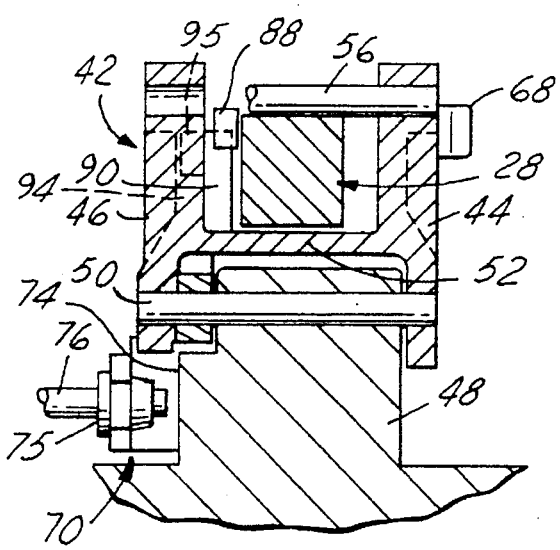
FIG. 10 is a fragmentary sectional view taken on the line 10—10 in FIG. 11.

Bracket 42 is urged to its FIG. 3 position by a tension coil spring 67 connected to an anchor 68 on one of the bracket legs and to a pin 69 on cleat 36.

Figure 12:
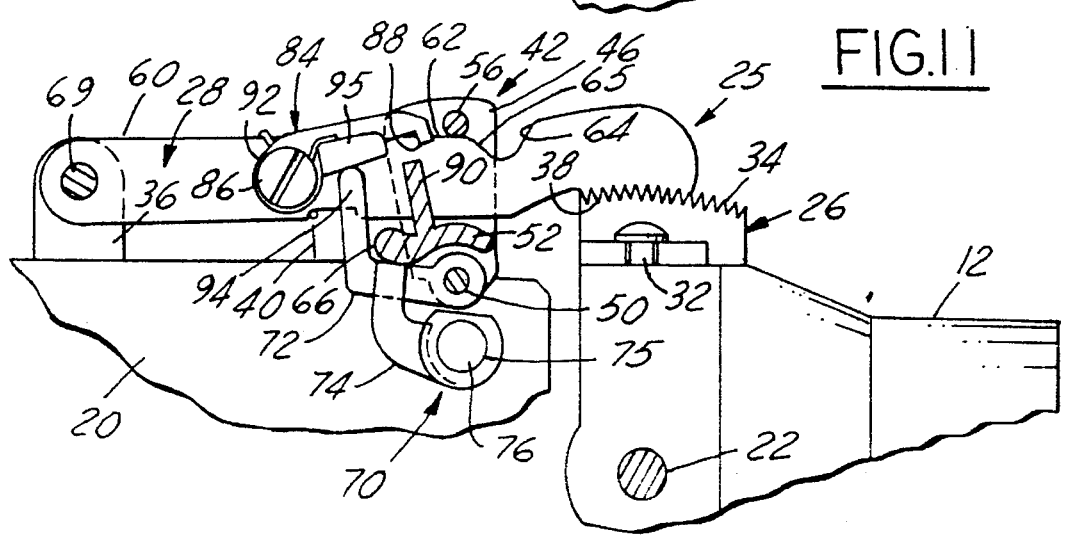
Figure 13:
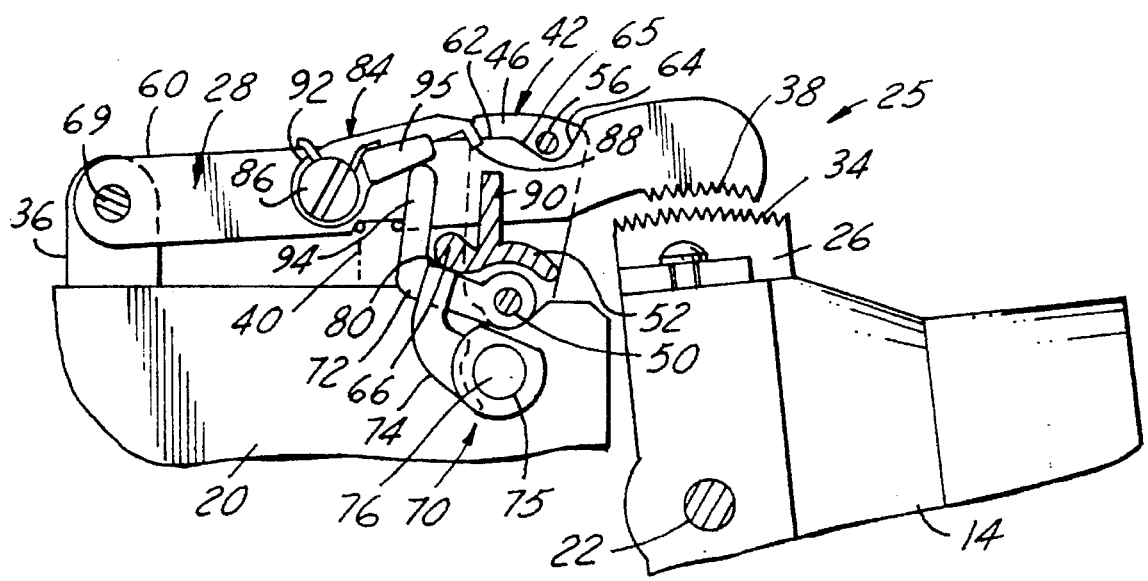

The bracket 42 can be pivoted from the FIG. 3 position to the position of FIG. 13 and back by a release lever 70. Lever 70 has two legs 72 and 74. The leg 72 is pivoted on the bracket pivot pin 50. The leg 74 is swiveled on the inner end of a hand lever 76. More specifically the inner end of the hand lever 76 extends through a tubular grommet 75 in a hole in the leg 74 of release lever 70. The internal bore of the grommet is circular throughout its length but flaring at the ends to provide a swivel support for the hand lever. The hand lever 76 is pivoted intermediate its ends on the support structure 20 by a pivot pin 78. The arm 74 of the lever 70 is interconnected with arm 72 and has a top surface 80 which is disposed directly under the lobe 66 of the web 52 of bracket 42. When the hand lever 76 is manipulated to move its inner end in a generally forward direction, the release lever 70 is pivoted about pivot pin 50 from the FIG. 3 position to the position of FIG. 13. This causes the top surface 80 to engage the lobe 66 and turn the bracket 42 clockwise in FIGS. 3 and 11–13 which in turn causes the lock pin 56 to slide from the locking surface portion 62 of the pawl to the release surface portion 64, allowing the pawl to pivot upwardly and the pawl teeth to become disengaged with the rack teeth. The upward pivoting of the pawl is caused by the spring 40 and also by engagement of lobe 66 with the underside of the pawl as shown in FIG. 11.

Figure 11:
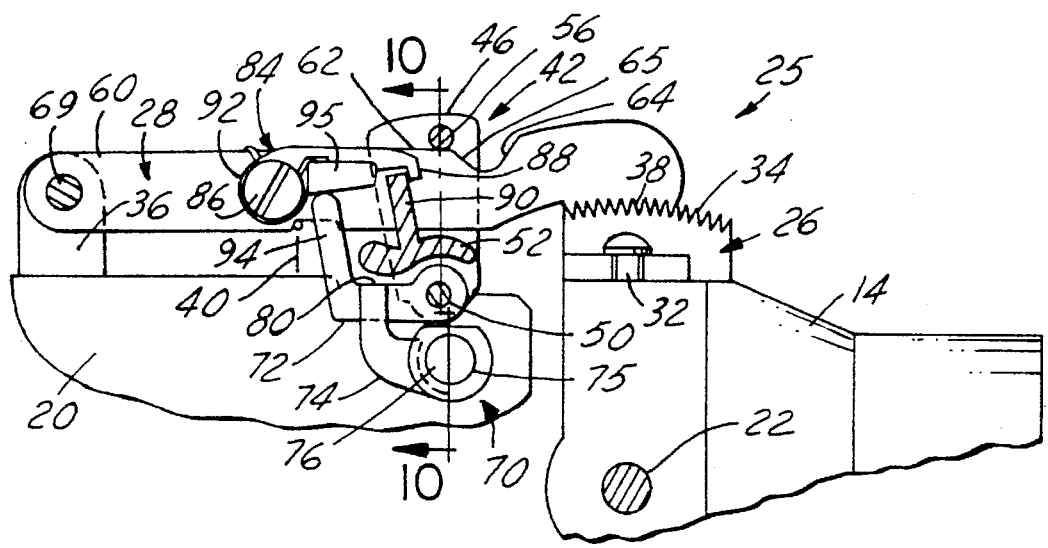
FIGS. 11–13 are side views similar to a portion of FIG. 3, showing the parts in different positions.

Normally, that is, when the bracket is in the position of FIGS. 3 and 11, it is locked in this position by a latch 84, the latch 84 is a somewhat elongated member having one end pivoted to the pawl at 86. The opposite end of the latch has an L-shaped hook 88 which is adapted to engage over a rib or catch 90 formed integrally on the leg 46 of the bracket. This can be seen clearly in FIG. 11. The latch is urged clockwise in FIG. 11 by a coil spring 92 to maintain the engagement of the rib 90 on the bracket 42 in the hook 88 of the latch. The latch retains the bracket in the position of FIGS. 3 and 11 and prevents it from accidentally shifting clockwise to the release position as might possibly occur if too much torque is placed on the steering column.

In order to shift the bracket 42 clockwise to the release position of FIG. 13, the latch 84 must first be released. To accomplish the release of the latch, the release lever 70 has an extension 94 of one arm 72 which is disposed beneath an abutment 95 on the latch. The construction of the release lever is such that when pivoted clockwise, the tip of the extension 94 will engage the abutment 95 on the latch, and lift the latch to the FIG. 12 position, before the top surface 80 of the arm 74 of the release lever engages the lobe 66 on the bracket. This happens in a rapid sequence so that when the hand lever 76 is shifted to turn the lever 70 clockwise in FIGS. 3 and 11–13, the latch is initially released and then afterwards the top surface 80 engages the lobe 66 to turn the bracket clockwise to the FIG. 13 position.

In use, the locking mechanism is shown in its normal position in FIGS. 3 and 11, with the pawl teeth held engaged with the rack teeth by the bracket pin 56 of the bracket bearing down on the locking surface portion 62 of the pawl. This provides a positive lock and prevents disengagement of the rack and pawl teeth under the usual conditions of vehicle operation. However, to ensure that the bracket pin 56 does not accidentally slide from the locking surface portion 62 of the pawl to the release surface portion 64 thereof, the latch, by reason of its positive engagement with the rib 90 on the bracket, eliminates any possibility of release movement of bracket 42 and accidental disengagement of the pawl and rack teeth. When it is desired to change the tilt of the steering column, the hand lever 76 is manipulated to turn the release lever 70 from the FIG. 11 position to the positions of FIGS. 12 and 13 in sequence. The latch will initially be raised to disengage hook 88 from rib 90 on the bracket, as shown in FIG. 12, and continued rotation of the release lever will then cause the top surface 80 on the release lever to engage the lobe 66 on the bracket and pivot the bracket clockwise to the FIG. 13 position so that the pawl will become disengaged with the rack and permit adjustment in the tilt of the steering column.

We claim:

1. Apparatus for releasably locking the tilt steering column of an automotive vehicle in adjusted position, comprising support structure adapted to be affixed to the vehicle frame, a steering column assembly, means pivotally mounting said steering column assembly on said support structure for vertical pivotal movement, a rack carried by said steering column assembly and having rack teeth, a pawl having first and second ends, pawl teeth at said first end of said pawl, means pivoting said second end of said pawl to said support structure for pivotal movement of said pawl to positions engaging and disengaging said rack and pawl teeth, a bracket, means pivoting said bracket to said support structure for movement between first and second positions, said pawl having a cam surface provided with locking and release surface portions, said bracket having a lock pin slidable over said cam surface and engageable with said locking surface portion thereof in its first position and with said release surface portion thereof in its second position, said pawl, when said bracket is in its first position, being moved by said lock pin to its position engaging said rack and pawl teeth to lock said steering column assembly in adjusted position and when said bracket is in its second position, being released by said lock pin for movement to its position disengaging said rack and pawl teeth and releasing said steering column assembly, means operative when said bracket is moved to its second position for moving said pawl to its position disengaging said rack and pawl teeth, latching means for latching said bracket in said first position thereof, and operating means for releasing said latching means and thereafter in sequence for moving said bracket from the said first to the said second position thereof.

2. Apparatus as defined in claim 1, wherein said latching means comprises a latch pivoted on said pawl for movement from a retracted position to a latching position, a catch on said bracket, and a hook on said latch engageable with said catch when said latch is moved to said latching position.

3. Apparatus as defined in claim 2, and further including spring means urging said latch to said latching position.

4. Apparatus as defined in claim 3, wherein said operating means comprises a release lever pivoted to said support structure, means for pivoting said release lever from a retracted position through an intermediate position to an advanced position, said release lever having a first arm engageable with said latch in said intermediate position to move said latch to its retracted position disengaged from said catch, said release lever having a second arm engageable with said bracket in the advanced position thereof to move said bracket to its second position.

5. Apparatus as defined in claim 4, wherein said means for moving said pawl to its position disengaging said rack and pawl teeth comprises a part on said bracket engageable with said pawl when said bracket is in its second position.

6. Apparatus as defined in claim 5, and further including a hand lever pivoted to said support structure for pivoting said release lever.

7. Apparatus as defined in claim 1, wherein said bracket has a pair of legs straddling said pawl, and said pin extends across the outer side of said pawl and has its ends secured to said legs.

8. Apparatus as defined in claim 7, wherein said depressed release surface portion of said pawl has an inclined surface engaged by said pin when said bracket is moved to its first position to move said pawl teeth into engagement with said rack teeth.

9. Apparatus as defined in claim 8, wherein said means for moving said pawl to its second position comprises a part on said bracket engageable with said pawl.

10. Apparatus as defined in claim 9, and further including resilient means urging said bracket to said first position thereof.

11. Apparatus as defined in claim 10, wherein said latching means comprises a latch pivoted on said pawl for movement from a retracted position to a latching position, a catch on said bracket, and a hook on said latch engageable with said catch when said latch is moved to said latching position, and further including spring means urging said latch to said latching position.

12. Apparatus as defined in claim 11, wherein said operating means comprises a release lever pivoted to said support structure, means for pivoting said release lever from a retracted position through an intermediate position to an advanced position, said release lever having a first arm engageable with said latch in said intermediate position to move said latch to its retracted position disengaged from said catch, said release lever having a second arm engageable with said bracket in the advanced position thereof to move said bracket to its second position, said means for moving said pawl to its position disengaging said rack and pawl teeth comprising a part on said bracket engageable with said pawl when said bracket is in its second position.

\* \* \* \* \*